June 23, 1936.  W. R. GRISWOLD  2,045,011
MOTOR VEHICLE
Filed Oct. 24, 1932
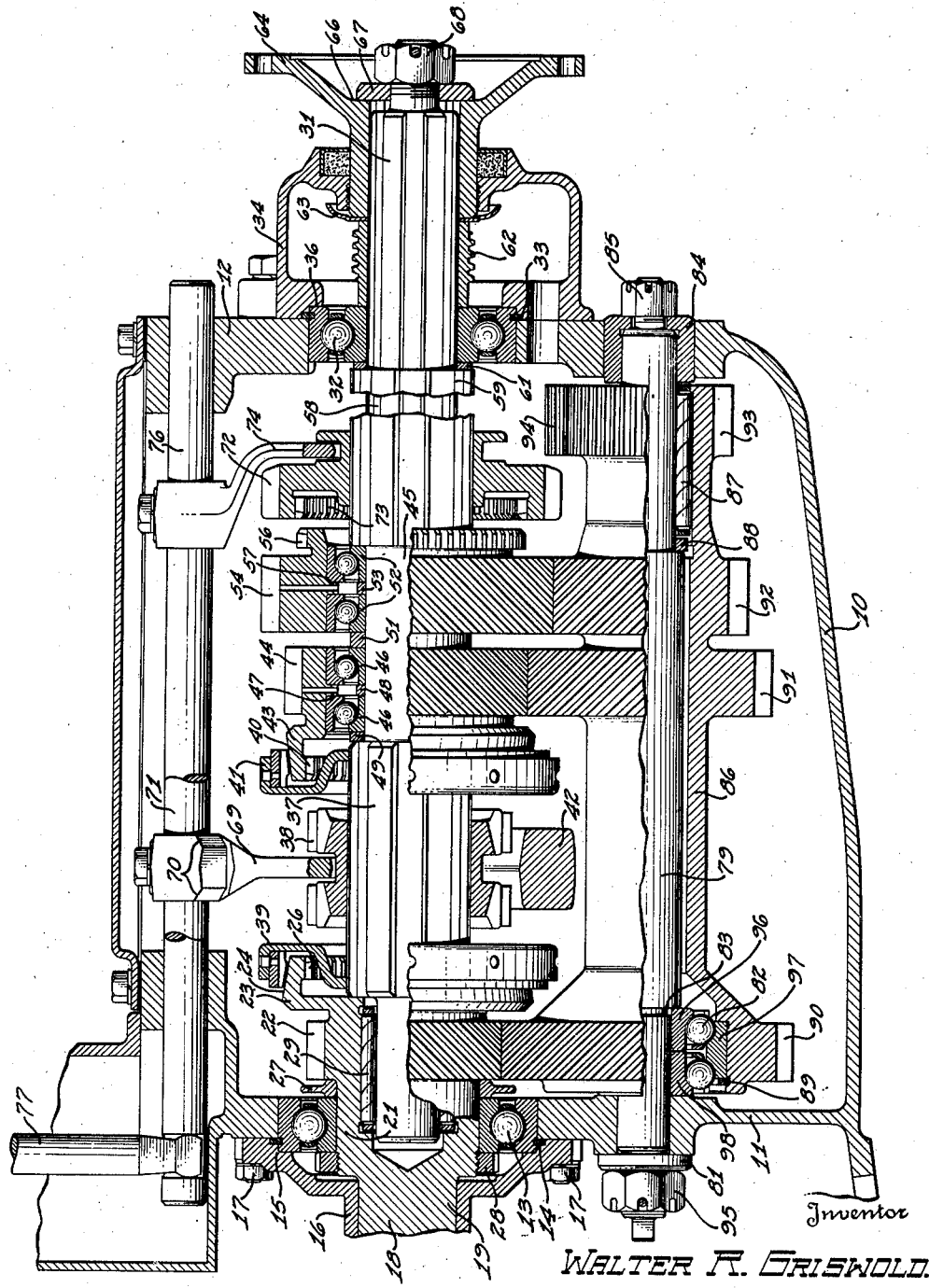
Inventor
WALTER R. GRISWOLD.
By
Attorney Patented June 23, 1936

2,045,011

UNITED STATES PATENT OFFICE 2,045,011

MOTOR VEHICLE

Walter R. Griswold, Detroit, Mich., assignor to Packard Motor Car Company, Detroit, Mich., a corporation of Michigan Application October 24, 1932, Serial No. 639,197

12 Claims. (Cl. 74—333)

This invention relates to motor vehicles and more particularly to the transmission mechanism thereof.

Motor vehicle transmissions have been undergoing constant improvement for many years. A minimum of noise both in direct drive and in the gears has been desired and its attainment has necessitated a great many changes. The addition of synchronizers so that the shift from one gear ratio to another could be made quietly brought with it the necessity for constant mesh gears and constant mesh gears in turn necessitated additional preventatives in order to insure silence of operation. Helical gears have been found to produce less noise than spur gears but have in turn brought with them thrust problems associated with the mounting of the gears on the transmission shafts and have also necessitated improvement in the mounting of the transmission shafts in the transmission casing.

One of the objects of my invention is to provide suitable thrust-resisting mountings for the thrust generating gears of a transmission having sets of constant mesh helical gears.

Another object of my invention is to provide a transmission mechanism, having sets of constant mesh gears, with means for accurately locating the various gears with respect to each other and the various shafts with respect to each other and with respect to the transmission casing.

Other objects of the invention will appear from the following description taken in connection with the drawing, which forms a part of the specification, and in which the single figure is a longitudinal sectional view, with parts in elevation, of a motor vehicle transmission mechanism incorporating my invention.

Referring to the drawing, 10 illustrates a transmission case, adapted to be inserted in a motor vehicle driving train preferably between the clutch and the propeller shaft, and having a front wall 11 and a rear wall 12.

The front wall 11 is suitably bored out for the reception of a ball thrust bearing 13, the outer race of which is notched for the reception of a snap ring 14 which serves as an axial locating means for the ball bearing. A suitable cover 16 is bolted as at 17 to the front wall of the transmission casing and has a shoulder 15 formed on the inner face thereof for the reception of the snap ring 14 and for the outer race of the ball bearing 13. The shoulder serves to prevent movement of the race to the left or forwardly of the transmission and the snap ring serves to prevent movement of the race to the right or rearwardly. Thus, the ball bearing is securely located in the wall of the transmission casing.

Projecting through the ball bearing and supported thereby is a driving shaft 18 which may be the clutch shaft, formed with a portion 19 within the housing 16 and a bearing portion 21 within the ball bearing 13. On the inner end of the shaft is formed a helical gear 22 and a synchronizer cone 23. The outer face 24 of the synchronizer cone forms one-half of a friction clutch for synchronizing the gear 22 with the other transmission elements prior to their positive direct-drive engagement. For positive driving the driving shaft 18 is provided with a dog clutch 26 on the inner side of the synchronizer cone, which is engaged with other mechanism to be later described. Surrounding the driving shaft between the shoulder formed by the gear 22 and the inner race of the ball bearing 13 is an oil or shim ring 27 which serves to seal the ball bearing against excessive leakage of the transmission lubricant and which serves also as a spacing means for axially locating the clutch shaft 18 in the front wall 11 of the transmission casing. Locking nut 28, threaded on to the outer end of the bearing portion 21, holds the clutch shaft 18 against the oil ring 27, and holds the oil ring against the ball bearing 13, thus preventing axial movement of the clutch or driving shaft 18 in either direction.

The clutch shaft, at its inner end, is recessed or bored out for the reception of a roller bearing 29 which serves to support the forward end of a transmission main shaft or driven shaft 31, the rear end of which is supported in the rear wall 12 of the transmission casing. The casing is bored out for the reception of a ball bearing 32 the outer race of which is slotted for the reception of a snap ring 33 which bears against the outer side of the rear wall and serves to prevent movement of the bearing 32 to the left. Bolted to the rear wall 12 of the transmission casing is a housing member 34 having a shoulder 36 bearing against the rear end of the outer race of the bearing 32. Thus, the bearing 32 is held axially of the transmission casing wall and, in a manner to be described, serves axially to position the driven shaft 31.

The driven shaft 31, adjacent the roller bearing 29, is splined as at 37. On this splined portion are mounted a positive clutch element 38 and a pair of friction or synchronizer clutch elements 39 and 41. These synchronizer elements are axially spaced by means of a yoke member, not shown, which in turn is moved axially of the shaft 31 by a synchronizer operating yoke 42 mounted, in a manner not shown, in the side walls of the transmission. The Beringer Patent 1,849,032, dated March 8, 1932, illustrates the mounting and functioning of the synchronizer elements more in detail. It is sufficient here to say that the synchronizer elements 39 and 41 have a range of operation which is fixed by the location of the yoke 42. The synchronizer cone 23 and the corresponding cone for second gear must be assembled in the proper relationship with the synchronizer elements 39 and 41. The location of this range of movement of the synchronizer elements 39 and 41 also determines the proper axial position of the driving shaft 18 and the driven shaft 31. Thus, it is evident that variations in the thickness of the spacing shim 27 will serve to locate the driving shaft accurately with respect to the synchronizer element 39.

Elements 39 and 41 are suitably recessed, as suggested in the above mentioned Beringer patent, so that the positive clutch element 38 may project through the synchronizer elements and engage either the positive clutch teeth 26 on the driving shaft 18, or positive clutch teeth 40 mounted on the inner side of a synchronizer cone element 43 integral with a transmission main shaft second speed gear 44.

Adjacent the splined portion 37 of the driven shaft 31 is a smooth portion 45 having a diameter less than the outer diameter of the splines on the portion 37 of the shaft. It is on this smooth portion that the gear 44 is rotatably mounted, in a manner which comprises a pair of opposed ball bearings 46 abutting against an internal shoulder 47 formed on the gear 44. The shoulder 47 thus serves to position the gear 44 with respect to the bearings 46. The inner races of the bearing 46 are separated by a spacer member 48 having an axial length equal to that of the shoulder 47. The assembly of the two bearings 46, the spacer 48 and the gear 44 is placed near the end of the splines on the portion 37 of the driven shaft and spaced therefrom by a spacing ring 49 the inner face of which is machined to conform to the fillet between the splined portion 37 and the smooth portion 45 of the shaft. Continuing rearwardly of the driven shaft 31 beyond the gear 44 there is a spacer 51 and a second pair of opposed ball bearings 52 separated by a spacer 53. The bearings 52 serve to support and position axially of the driven shaft a transmission main shaft low speed gear 54 having formed thereon a set of dog clutch teeth 56 and an inner shoulder 57 similar in purpose to the shoulder 47 on the gear 44.

The smooth portion 45 of the driven shaft 31 ends immediately beyond the rearmost ball bearing 52 and the shaft from there on is splined as shown at 58, the outer diameter of the splines being no greater than the diameter of the smooth portion 45. Surrounding the splined portion 58 within the transmission is a splined sleeve 59 and a spacing shim 61. The splined sleeve 59 has an outer diameter substantially equal to that of the inner race of the ball bearing 52 and serves to hold the gears 44 and 54 and their mountings pushed up against the splined portion 37 of the driven shaft, thus preloading the bearings. The splined sleeve 59 is in turn held by the spacing shim 61 which lies against the inner race of the ball bearing 32 which, as previously described, is axially fixed in the rear wall 12 of the transmission casing.

The splined portion 58 of the driven shaft 31 continues through the supporting inner race of the ball bearing 32. Lying against the outer side of the inner race of the bearing 32 is a speedometer drive gear 62 and rearwardly of this gear is an oil thrower ring 63 arranged to shield the outer end of the housing 34 against a possible flow of lubricant through the housing at this point. Projecting through the housing is a universal joint flange member 64 splined to the shaft 31. The splined sleeve portion of the flange holds the oil thrower ring 63 against the end of the speedometer drive gear 62, and is formed with an internal shoulder 66 against which bears a washer 67 surrounding the projecting end of the driven shaft 31. A nut 68, threaded on the reduced end of the driven shaft 31 pulls the shaft axially of the transmission until the splines 37 press the shim 61 against the bearing 32 and at the same time the washer 67 pushes the universal joint flange 64 against the speedometer drive gear 62 which in turn abuts against the inner race of the ball bearing 32. Thus, the adjustment of the nut 68 and the thickness of the shim 61 serves axially to position the entire driven shaft assembly and the gears thereon.

I have previously described the dog clutch element 38 which serves as a means of clutching the gear 22 or the gear 44 to the splined portion 37 of the driven shaft 31. This dog clutch element 38 is controlled by a shifter fork 69 mounted on a shifter rail 71 carried in the upper portion of the transmission casing. The shifter fork 69 is formed with diagonal wedge faces 70 which serve to operate plungers mounted on the synchronizer operating yoke 42 so that the synchronizers 39 or 41 are operated prior to the engagement of the teeth 26—38 or 40—38.

The means for clutching the gear 54 to the shaft 31 includes a shiftable low speed and reverse gear 72 slidably splined to the outer surface of the splined sleeve 59 and having thereon clutch teeth 73 engageable with the clutch teeth 56 on the gear 54. A shifter fork 74 mounted on a second shifter rail 76 serves to move the gear 72 axially of the driven shaft 31. A gear shift lever 77 selects and operates one of the shifter rails 71 or 76.

Spaced from the axis of the driving and driven shafts and lying parallel thereto is a countershaft 79. Each end of the countershaft is threaded for the reception of a nut and the forward end is provided with a washer 81, bearing against the outside of the front wall 11 of the transmission case, which serves to hold the countershaft against movement thereof to the right. Immediately inside of the front wall of the transmission case is mounted a double row ball bearing 82 which bears against a shoulder 83 on the countershaft and which also bears against the front wall 11 of the transmission case. Thus, when the forward nut is tightened up, the bearing 82 bears against the washer 83 and the shoulder 81 bears against the front wall of the transmission case so that the countershaft is thus axially positioned. The rear end of the countershaft is supported in a bushing 84 mounted in the rear wall 12 of the transmission casing and held on the countershaft by the rear nut 85.

A countershaft gear cluster or spool 86 is mounted at its forward end on the ball bearing 82 and at its rearward end on a roller bearing 87 floatingly mounted on the countershaft 79 between a spacer 88 and the bushing 84, suitable clearance being provided between the spacer 88 and the bushing so that the roller bearing is free to float axially of the countershaft 79. The countershaft gear cluster is axially fixed on the countershaft by means of a snap ring 89 which holds the outer race of the ball bearing 82 fixed in a recess formed in the forward end of the cluster. Thus, the bearing 82 positions the cluster 86 and the front wall 11 of the transmission in turn positions the bearing 82.

In assembling the bearing 82, the gear cluster 86, and the countershaft 79 in the transmission casing, I first prepare the cluster for installation and then, while manually holding it in its location, I push the countershaft through the cluster. When it is in place, I adjust the nut 95 until the gear cluster is properly located and the angular thrust bearing 82 is properly pre-loaded. In preparing the cluster for assembly, I first insert therein the right-hand portion 96 of the inner race, together with the right-hand row of ball bearings and the right-hand retainer, then I insert the outer race 97 and apply the snap ring 89, thus accurately locating and positioning the outer race in the cluster. I then apply the left-hand row of balls and the left-hand portion 98 of the split inner race to the shaft and then slide the shaft into the spool, holding the cluster assembly in position. I then adjust the nut 95, pulling the races 96 and 98 up against the front wall 11 of the transmission casing by means of the shoulder 83 on the countershaft. Sufficient clearance is provided between the ends of the inner races so that when those races are pulled together the proper degree of angular pre-loading may be applied to each row of ball bearings, thus contributing materially to the silence of operation of the countershaft assembly.

This method of pre-loading the bearing elements and of mounting the countershaft and the countershaft gear cluster contributes materially towards a long and silent transmission life without increasing transmission size and weight.

The gear cluster itself includes, as integral parts thereof, a countershaft-clutch-shaft constant mesh gear 90 meshing with the clutch shaft gear 22, a countershaft second speed constant mesh gear 91 meshing with the gear 44, a countershaft low speed gear 92 meshing with the main shaft low speed gear 54, and a reverse gear 93 meshing with a reverse idler gear 94 suitably journaled in the transmission casing. The reverse idler gear 94 is in turn adapted to mesh with the main shaft low speed and reverse gear 72.

In operation, direct drive is obtained by manipulating the gear shift lever 77 to move the shifter fork 69 forwardly. The axial wedging faces 70 operate the synchronizer yoke 42 to cause engagement of the synchronizer faces 39 and 24 and then, when the driving and driven shafts have been synchronized, the teeth on the dog clutch element 38 engage the teeth 26 on the driving shaft 18 and power is transmitted from the driving shaft direct to the splined portion 37 of the driven shaft and from there to the universal joint flange 64. Second speed is obtained by shifting the positive clutch element 38 to the rear which results first in operation of the synchronizer faces 41 and 43 to synchronize the gear 44 with the driven shaft 31 and then in engagement with the clutch teeth 38 and 40. Low speed is obtained by moving the shifter fork 74 forwardly until clutch teeth 56 and 73 are engaged and reverse gear is obtained by shifting the gear 72 to the gear until its spur teeth engage the spur teeth on the gear 94.

I have chosen to make the constant mesh gears 22—90, 44—91, 54—92 helical in form in order that the above described transmission may operate with a minimum of noise. In order that the thrust might be properly balanced both in second gear and in low gear, and in view of the different ratios of the gear sets engaged in second and in low, I have found it desirable to use a different helix angle in each set of constant mesh gears and to make the gears on the countershaft opposite in lead from those on the driving and driven shafts. Thus, the gears 22, 44 and 54 all have left-hand helix angles and the gears 90, 91 and 92 all have right-hand helix angles. In such a case, the helix angle of the gears 22 and 90 will be greater than the helix angle of the gears 44—91 which in turn will be greater than the helix angle of the gears 54—92. In an actual case, these angles will be chosen for the particular dimensions of the design, and the difference between the largest and the smallest angle need not be more than ten degrees. This construction will result in a substantially balanced thrust on the countershaft both in low gear and in second gear. In reverse gear, there will be, however, some unbalance but because of the design and location of the bearings this unbalanced thrust will be suitably absorbed.

Although the thrust on the countershaft gear cluster is balanced, and results merely in tension of the cluster sleeve between the gears 90 and 91, it is evident that no such similar means of balancing can be used between the gears 22 and 44 or the gears 22 and 54 because these gears are mounted on separate shafts. It is for this purpose that I have provided the bearings 13 and 32 which serve accurately to maintain the alignment of the shafts and the center distances between the various gears. It is essential for minimum noise that the helical gears be maintained accurately in position and in addition to the bearing for supporting the shafts I have devised a novel bearing mounting for the gears themselves on the shafts which mounting will resist all thrust.

In addition to obtaining a satisfactory gear mounting in a helical gear transmission, it is also necessary to bear in mind the manufacturing and assembling problems. In addition to solving the mounting problem, I have also solved these two other problems without sacrificing either rigidity of mounting or ease of assembly. In assembly practice, the transmission synchronizers 39 and 41 may be located in place and the distance from the cone 39 to the bearing 13 measured. A shim 27 of proper thickness is then chosen so that the synchronizer cone 23 on the gear 18 will bear the proper relationship with the synchronized element 39. The nut 28 is then tightened and the driving shaft 18 is located. The driven shaft assembly, including the gears 44, 54, the bearings 46 and 52, the spacers 49 and 51, and the splined sleeve 59 are all assembled and a shim 61 of suitable thickness is chosen so that the synchronizer cone 43 on the gear 44 will be properly located with respect to the synchronizer element 41. These elements are then assembled in place and the nut 68 tightened up and the driven shaft 31 is thus located.

I have thus described a transmission having sets of constant mesh helical gears in which the several gears may be placed accurately in position and permanently maintained in such position. This accuracy of position contributes materially to the silence of operation of the transmission assembly. I have also described a transmission construction which may be accurately assembled with a minimum of accurate and time consuming measurements, which materially contributes to the serviceability of the transmission.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a geared drive, a driving gear, a driven shaft, a driven gear free to rotate on said driven shaft in meshing engagement with said driving gear, said gears having a tooth form tending to move said driven gear axially of the shaft, a pair of oppositely disposed ball bearing members between the shaft and the driven gear fixedly locating said gear axially on the shaft, said members being adjustable relatively in an axial direction and arranged to absorb radial and opposed axial thrust between the driven gear and the shaft, and means for pre-loading said bearing members.

2. In a motor vehicle transmission, a casing having spaced aligned front and rear openings in the walls thereof, a driving shaft having an end extending through an opening in said casing and formed with a bore therein, a two-way thrust bearing supporting said driving shaft in said front opening, a driving gear surrounding said bore and fixed to said shaft, a countershaft mounted in said casing at a distance from the axis of said driving gear, a gear spool mounted on said countershaft and having a gear in constant engagement with said driving gear, means connecting said spool and countershaft for absorbing axial thrust, a driven shaft piloted in the bore in said driving shaft and projecting through the rear opening in the casing, said driven shaft comprising a first splined portion adjacent the bore, a smooth portion with a diameter less than the outer diameter of the splined portion and a second splined portion with an outer diameter no greater than that of the smooth portion, radial and axial thrust resisting means in the rear casing opening for carrying said driven shaft, variable means to control the position of said driven shaft with respect to said thrust resisting means, said variable means abutting the first splined portion on said driven shaft, second and low speed driven shaft gears constantly engaging corresponding gears on said countershaft spool, the six gears of the three sets of constant mesh gears having teeth formed to generate an axial thrust on their respective mountings, and means between said driven shaft and said second and low speed constant mesh gears and including rolling elements, to absorb opposed axial thrusts between said shaft and said gears.

3. In a motor vehicle transmission, a casing having front and rear aligned openings in the walls thereof, a driving shaft having an end extending through an opening in said casing and formed with a bore therein, a two-way thrust bearing supporting said driving shaft in said front opening, a driving gear surrounding said bore and fixed to said shaft, a countershaft mounted in said casing at a distance from the axis of said driving gear, a gear spool mounted on said countershaft and having a gear in constant engagement with said driving gear, means for absorbing axial thrust connecting said spool and countershaft, a driven shaft piloted in the recess of said driving shaft and projecting through the rear casing opening, said shaft comprising a first splined portion adjacent the recess, a smooth portion with a diameter less than the outer diameter of the splined portion and a second splined portion with an outer diameter no greater than that of the smooth portion, radial and axial thrust resisting means connecting said driven shaft to said casing, adjustable means to control the position of said driven shaft with respect to said axial thrust bearings, said adjustable means abutting the first splined portion on said driven shaft, second and low speed driven gears constantly engaging corresponding gears on said countershaft spool, the six gears of the three sets of constant mesh gears having teeth formed to generate an axial thrust on their respective mountings, and supporting means between said driven shaft and said second and low speed constant mesh gears including a pair of oppositely disposed ball thrust bearings arranged to absorb oppositely disposed axial thrusts between each of said gears and said driven shaft.

4. In transmission mechanism, a casing having a two-way ball thrust bearing supported in the end wall thereof; a driven shaft supported by said bearing and having a first splined portion, a second portion adjacent said splined portion of less diameter than the outer diameter of the splined portion and a third portion adjacent the second portion and having splines thereon the outer diameter of which is no greater than that of the second portion; a pair of similar radial and axial ball bearings on the second portion adjacent the splines of the first portion, said bearings being oppositely disposed; a second pair of similarly disposed and similar bearings on the second portion adjacent the third portion of the shaft; a sleeve splined internally to fit the third portion and abutting the second pair of bearings and the inner race of the ball bearing in the wall of said casing; and adjustable means for locating and fixing said shaft, said bearings, and said sleeve axially with respect to the wall of the casing and each other.

5. In transmission mechanism, a casing having a two-way ball thrust bearing supported in an end wall thereof; a driven shaft supported by said bearing and having a first splined portion, a second portion adjacent said splined portion of less diameter than the outer diameter of the splined portion, and a third portion adjacent the second portion and having splines thereon the outer diameter of which is no greater than that of the second portion; a pair of similar radial and axial thrust resisting bearings, including rolling elements, on the second portion adjacent the splines of the first portion, the rolling elements in each pair being oppositely disposed, a second pair of similarly disposed and similar bearings on the second portion adjacent the third portion of the shaft; a sleeve splined internally to fit the third portion and abutting the second pair of bearings and the inner race of the ball bearing in the wall of said casing; adjustable means for locating and fixing said shaft, said bearings, and said sleeve axially with respect to the wall of the casing and each other; and an inclined-tooth gear supported on each of said pairs of bearings.

6. In a transmission, a casing, a driving shaft, a driven shaft, a fixed countershaft, said shafts and countershaft being supported in said casing, geared means connecting said driving and driven shafts including a multiple gear element surrounding said countershaft, bearing means for supporting said element on said countershaft including a radial thrust absorbing bearing and a combined radial and axial thrust absorbing bearing, each of said bearings including rolling elements and said combined bearing fixing said multiple gear element axially on the countershaft, and means for pre-loading said combined radial and axial thrust absorbing bearing.

7. In a motor vehicle transmission, a driving shaft, a driven shaft, a countershaft, a casing in which said shafts and countershaft are mounted, gear means connecting said driving and driven shafts including a multiple gear cluster surrounding said countershaft, bearing means for supporting said cluster on said countershaft including a pair of oppositely disposed radial and axial thrust resisting ball bearings, said bearings being adjustable relatively in a direction to fix the cluster axially on the countershaft, and means for pre-loading said bearing means.

8. In transmission mechanism, a casing having a two-way ball thrust bearing supported in the end wall thereof; a driven shaft supported by said bearing and having a first splined portion, a second portion adjacent said splined portion and having a diameter less than the outer diameter of the splined portion, and a third portion adjacent the second portion and having splines thereon the outer diameter of which is no greater than that of the second portion; a pair of similar radial and axial thrust resisting bearings, including rolling elements, on the second portion adjacent the splines of the first portion, said bearings being oppositely disposed; a second pair of similarly disposed and similar bearings on the second portion adjacent the third portion of the shaft; a sleeve splined internally to fit the third portion and abutting the second pair of bearings and the inner race of the ball bearing in the wall of said casing; and adjustable means for locating and fixing said shaft, said bearings, and said sleeve axially with respect to the wall of the casing and each other.

9. In a transmission, a wall having an opening therein, a shaft projecting through the wall, thrust resisting means on the shaft, thrust generating means on said shaft, opposed rows of thrust bearing elements engaging said thrust generating means and said thrust resisting means, and means on the shaft co-operating with the transmission wall and said thrust resisting means adjustable to angularly pre-load each row of bearing elements.

10. In a transmission mechanism, a casing having a wall portion with an opening therein, a two diameter shaft having a portion of its reduced end extending through the opening in the casing walls, the portion of said shaft between the two diameters forming a shoulder, means associated with said shaft and said casing for adjusting the shaft axially, a pair of spaced thrust resisting bearing elements slidably mounted on the reduced portion of the shaft intermediate the shoulder and the casing wall through which the shaft extends, a gear encircling the thrust resisting bearing means, a bearing element fixed to the interior of the gear, and a row of balls between each of the thrust resisting bearing elements and the bearing element fixed to the gear, the rows of balls being arranged in opposed angular relation, said shaft being adjusted axially to pre-load the rows of balls by moving the pair of thrust resisting bearing means toward each other while engaged between the shoulder and the casing wall with the opening therethrough.

11. In a transmission mechanism, the combination of a shaft, a gear element surrounding the shaft, bearing means between the shaft and the gear element and adapted to take both radial loads and thrust loads in both directions, said bearing means comprising two spaced rows of balls, and means associated with the shaft for definitely pre-loading the bearing means.

12. In a transmission mechanism, the combination of a shaft having a shoulder, a gear surrounding said shaft, two spaced ball races in the gear, two corresponding ball races on the shaft, one of said latter races abutting against said shoulder, a spacer between the ball races on the shaft, parallel rows of balls between the two pairs of races to rotatively support the gear on the shaft, and means for clamping the shaft races and spacer in position on the shaft and against said shoulder.

WALTER R. GRISWOLD.